(12) United States Patent
Siders et al.

(10) Patent No.: US 7,371,154 B2
(45) Date of Patent: *May 13, 2008

(54) DUAL OPHTHALMIC LENS MACHINING PLATFORM AND SIMULTANEOUS OPHTHALMIC LENS MANUFACTURING METHOD

(75) Inventors: Larry K. Siders, Wooster, OH (US); Donald F. Baechtel, Lyndhurst, OH (US)

(73) Assignee: NCRx Optical Solutions, Inc., Medina, OH (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/553,708

(22) Filed: Oct. 27, 2006

(65) Prior Publication Data

US 2007/0167112 A1 Jul. 19, 2007

Related U.S. Application Data

(62) Division of application No. 11/279,092, filed on Apr. 7, 2006, now Pat. No. 7,128,638, which is a division of application No. 11/191,422, filed on Jul. 27, 2005, now Pat. No. 7,086,928, which is a division of application No. 10/420,023, filed on Apr. 21, 2003, now Pat. No. 6,953,381, which is a division of application No. 09/760,623, filed on Jan. 16, 2001, now Pat. No. 6,568,990.

(60) Provisional application No. 60/176,658, filed on Jan. 18, 2000.

(51) Int. Cl.
*B24B 1/00* (2006.01)
*B24B 13/06* (2006.01)

(52) U.S. Cl. ............................ 451/41; 451/43; 451/5
(58) Field of Classification Search ................... 451/5, 451/11, 41–44, 64
See application file for complete search history.

(56) References Cited

U.S. PATENT DOCUMENTS

| 3,893,264 | A | * | 7/1975 | Behnke .................... 451/42 |
| 6,080,044 | A | * | 6/2000 | Lanham et al. ............. 451/42 |
| 7,086,928 | B2 | * | 8/2006 | Siders et al. ................. 451/5 |
| 7,128,638 | B2 | * | 10/2006 | Siders et al. ................. 451/5 |

* cited by examiner

*Primary Examiner*—David B Thomas
(74) *Attorney, Agent, or Firm*—Blynn L. Shideler; Krisanne Shideler; BLK Law Group

(57) ABSTRACT

A dual ophthalmic lens machining platform comprises a blocked lens mounting structure constructed to simultaneously receive a first and a second blocked lens blank, and configured to rotationally and linearly move each lens blank, wherein the first and second lens blank have at least one common axis of movement on the mounting structure; and at least one machine tool adapted to machine each lens blank. A method of manufacturing ophthalmic lens comprises the steps of mounting at least a first and a second blocked lens blank on the machining platform; and simultaneously performing at least one machining process on the two blocked lens blanks on the machining platform. The dual ophthalmic lens machining platform is configured to simultaneously receive and machine a left and a right blocked lens blank for forming a left and a right lens of a pair of eyeglasses.

20 Claims, 5 Drawing Sheets

DUAL OPHTHALMIC LENS MACHINING PLATFORM AND SIMULTANEOUS OPHTHALMIC LENS MANUFACTURING METHOD

RELATED APPLICATIONS

This application is a continuation-in-part of U.S. patent application Ser. No. 11/279,092 entitled "System and Method for Ophthalmic Lens Manufacture" filed on Apr. 7, 2006. U.S. patent application Ser. No. 11/279,092 published as U.S. patent application publication No. 2006-0166609 on Jul. 27, 2006 and is now U.S. Pat. No. 7,128,638 which issued Oct. 31, 2006.

U.S. patent application Ser. No. 11/279,092 is a division of U.S. patent application Ser. No. 11/191,422 entitled "System and Method for Ophthalmic Lens Manufacture" filed on Jul. 27, 2005. U.S. patent application Ser. No. 11/191,422 published as U.S. patent application publication No. 2005-0266772 on Dec. 1, 2005 and is now U.S. Pat. No. 7,086,928 which issued Aug. 8, 2006.

U.S. patent application Ser. No. 11/191,422 is a division of U.S. patent application Ser. No. 10/420,023 entitled "System and Method for Ophthalmic Lens Manufacture" filed on Apr. 21, 2003. U.S. patent application Ser. No. 10/420,023 published as U.S. patent application publication No. 2003-0181133 on Sep. 25, 2003 and is now U.S. Pat. No. 6,953,381 which issued Oct. 11, 2005.

U.S. patent application Ser. No. 10/420,023 is a division of U.S. patent application Ser. No. 09/760,623 entitled "System and Method for Ophthalmic Lens Manufacture" filed on Jan. 16, 2001. U.S. patent application Ser. No. 09/760,623 published as U.S. patent application publication No. 2001-0051490 on Dec. 13, 2001 and is now U.S. Pat. No. 6,568,990 which issued May 27, 2003.

U.S. patent application Ser. No. 09/760,623 claims the benefit of U.S. provisional patent application Ser. No. 60/176,658 entitled "System and Method for Ophthalmic Lens Manufacture" filed on Jan. 18, 2000. This application hereby incorporates by reference the above identified United States patent application publications and United States patents, in their entirety.

BACKGROUND OF THE INVENTION

1. Field of the Invention

The present invention relates to the manufacture of ophthalmic lenses. Specifically this invention relates to a dual ophthalmic lens machining platform and a method of simultaneously manufacturing pairs of ophthalmic lens.

2. Background Information

In the art of ophthalmic lens manufacture, finished ophthalmic lenses are usually made from finished uncut lenses or from semi-finished lens blanks. Finished uncut lenses are lenses that are optically finished on both front and back surfaces and only need to be edged to the proper shape and edge contour to become finished lenses. Semi-finished lens blanks have optically finished front surfaces; however, the back surfaces of these blanks need to be generated and fined and are then polished and/or coated to produce finished uncut lenses. The finished uncut lenses are then edged to the proper frontal shape and edge contour to fit into spectacle frames or other mounting structures. Within the meaning of the present application the terms spectacle, eyeglasses, or glasses can be used interchangeably. Single vision lenses that are outside the normal range of inventoried finished uncut lenses, and most multi-focal lenses, are made from semi-finished lens blanks. Semi-finished lens blanks are made with various front surface curve radii, and have various topographies including spherical, aspheric, hyperbolic, irregular aspheric such as progressive add lenses, and poly-spheric, such as executive type segmented bifocals and trifocals. Any specific semi-finished lens blank can be finished into a range or species of finished lens whereby each blocked lens blank is associated with a species of eyeglass prescriptions.

In order to generate a desired lens according to a specific prescription, calculations are required to determine the topography of the back surface of the lens. Such calculations typically involve variables that include the front surface radii of the semi-finished blank, the index of refraction of the lens blank material, prescription values of the desired lens, statutory values regarding minimum lens thickness, and the physical dimensions of the frame or mounting structure. In the art, various mechanisms have been devised to accomplish the physical process of producing a back surface of optical quality. Most of these methods begin by generating a back surface that approximates the desired back surface topography and surface smoothness. This approximate surface is then fined to a more perfect approximation in both curvature and surface smoothness. After the appropriate accuracy and smoothness is achieved in the fining process, the surface is then polished or surface coated to produce a surface of optical quality. The optically finished lens blank is then edged to the proper shape and edge profile to fit into the frame for which it was made. Finished lens may be further coated with tinting coatings, photo-chromic coatings, scratch resistant coatings (i.e. hard coats).

Many business entities that sell ophthalmic lenses do lens finishing as a profit center activity and as a way to expedite delivery of single vision lenses. Only a small percentage of these entities also do surfacing of ophthalmic lenses. The business volume of most of these entities cannot justify the costs of acquiring and operating a conventional surfacing laboratory as known in the art. Surfacing laboratory setup costs have heretofore been several times the cost of setting up a laboratory for edging only.

Hiring qualified technicians for ophthalmic lens finishing or training personnel to perform ophthalmic lens finishing is relatively easy. However, hiring and training optical technicians to operate a surfacing laboratory is not easy. In many communities it is very difficult to find personnel that are trained in surfacing on conventional equipment. Technicians who are qualified to do surfacing are generally remunerated at higher pay scales than technicians skilled only in edging.

In addition to the significantly higher equipment and personnel costs of a surfacing lab, there are also higher ongoing costs for the additional lab space required. At least several hundred square feet of operational space and storage space have heretofore been required for a full service surfacing and edging ophthalmic lens laboratory. Consequently there is a need for a system and method of ophthalmic lens manufacture that would significantly reduce the investment required to acquire a surfacing and edging laboratory. There is a further need for a system and method of ophthalmic lens manufacture that significantly reduces the costs associated with operating a surfacing and edging laboratory. Further, there is a need for a system and method of ophthalmic lens manufacture that is operative to perform surfacing and edging by an operator with little skill in the art.

Further, in the prior art, the processes of surfacing and edging are done on at least two separate machines. In the prior art, blocking for surfacing and edging required two separate blocking devices. Also in the prior art, the individual processes of lap tool surfacing and lens cribbing and safety beveling and edge grooving and edge polishing and lens engraving each requires its own machine or device or machine augmentation. Consequently, there is therefore a need for a system and method of ophthalmic lens manufacture that reduces the need to employ a plurality of expensive and complex machines to manufacture lenses.

Prescription lenses for patients are generally generated in pairs (i.e. right and left lenses) for a spectacle frame. Prior art systems typically generate each lens independently. Production cycle times for generating lenses may be reduced by employing multiple, independent, surfacing and edging machines in the laboratory to generate pairs of lenses, however duplication of equipment at least doubles the acquisition and operational costs of the laboratory. Thus there exists a need for a system and method of ophthalmic lens manufacture that provides for reduced production cycle times for pairs of prescription lens without significantly increasing costs for the laboratory.

SUMMARY OF THE INVENTION

It is noted that, as used in this specification and the appended claims, the singular forms "a," "an," and "the" include plural referents unless expressly and unequivocally limited to one referent. For the purposes of this specification, unless otherwise indicated, all No.s expressing any parameters used in the specification and claims are to be understood as being modified in all instances by the term "about." All numerical ranges herein include all numerical values and ranges of all numerical values within the recited numerical ranges.

The various embodiments and examples of the present invention as presented herein are understood to be illustrative of the present invention and not restrictive thereof and are non-limiting with respect to the scope of the invention. It is an object of the present invention to overcome the deficiencies in the prior art and to provide for efficient, effective simultaneous manufacture of ophthalmic lens using remotely a dual ophthalmic lens machining platform. It is a further object of the exemplary form of the present invention to provide a system and method for ophthalmic lens manufacture that is operative to perform surfacing of both lenses of a pair of lenses at the same time. It is a further object of the exemplary form of the present invention to provide a system and method for ophthalmic lens manufacture that is operative to perform edging of both lenses of a pair of lenses at the same time.

The above stated objects are achieved at least in part with a method of manufacturing ophthalmic lens according to one non-limiting aspect of the present invention. The method of manufacturing ophthalmic lens comprising the steps of: providing a machining platform that is operative to concurrently machine two ophthalmic lens and wherein the machining platform has at least one common axis of motion for the two ophthalmic lens being machined; mounting at least a first and a second blocked lens blank on the machining platform; and simultaneously performing at least one machining process on the two blocked lens blanks on the machining platform.

In one non-limiting aspect of the method of manufacturing ophthalmic lens according to the invention the step of simultaneously performing at least one machining process on the two blocked lens blanks on the machining platform includes simultaneously machining left and right ophthalmic lens from the blocked lens blanks on the machining platform.

In one non-limiting aspect of the method of manufacturing ophthalmic lens according to the invention, the step of simultaneously performing at least one machining process on the two blocked lens blanks on the machining platform includes back surface generation of the lens blanks and edging of the lens blanks. The back surface generation of each lens blank may include machining a back surface of the lens blank responsive to data representative of an eyeglass prescription. The edging of each lens blank may include machining an edge of the lens blank to include a contour adapted to be mounted in the lens receiving portion of an eyeglass frame responsive to data representative of the lens receiving portion. Each lens blank may remain blocked throughout the back surface generation and the edging of the lens blanks.

In one non-limiting aspect of the method of manufacturing ophthalmic lens according to the invention, the lens blanks are mounted on the lens blocks without regard to specific lens prescription data.

In one non-limiting aspect of the method of manufacturing ophthalmic lens according to the invention, the at least one common axis of motion for the two ophthalmic lens blanks being machined includes a common rotary axis for each lens blank, or a common linear axis, or both. In one non-limiting aspect of the method of manufacturing ophthalmic lens according to the invention, the common axis of motion for the two ophthalmic lens blanks being machined includes two common linear axes for each lens blank.

The above stated objects are achieved at least in part with a method of manufacturing ophthalmic lens according to one non-limiting aspect of the present invention. The method of manufacturing a pair of ophthalmic lens for a pair of eyeglasses comprising the steps of: providing a machining platform that is operative to concurrently machine two ophthalmic lenses; mounting a left and a right blocked lens blank on the machining platform adapted to form a left and a right lens for a pair of eyeglasses; and simultaneously performing at least one machining process on the left and right blocked lens blanks on the machining platform.

The above stated objects are achieved at least in part with a dual ophthalmic lens machining platform according to one non-limiting aspect of the present invention. The dual ophthalmic lens machining platform comprises: a blocked lens mounting structure constructed to simultaneously receive a first and a second blocked lens blank, and configured to rotationally and linearly move each lens blank, wherein the first and second lens blank have at least one common axis of movement on the mounting structure; and at least one machine tool adapted to machine each lens blank.

In one non-limiting aspect of the dual ophthalmic lens machining platform according to the invention the blocked lens mounting structure includes an arbor that rotationally supports both blocked lens blanks. In one non-limiting aspect of the dual ophthalmic lens machining platform according to the invention the blocked lens mounting structure includes a first mounting stage that receives the first lens blank and a second mounting stage that receives the second lens blank and wherein the first and second stages share a common linear actuator. Machine tools may be provided for each lens blank that are configured to perform back surface generation of the lens blanks and edging of the lens blanks. The blocked lens mounting structure may be configured to simultaneously receive and machine a left and a right blocked lens blank for forming a left and a right lens of a pair of eyeglasses.

These and other advantages of the present invention will be clarified in the brief description of the preferred embodiment taken together with the drawings in which like reference numerals represent like elements throughout.

DESCRIPTION OF THE PREFERRED EMBODIMENTS

FIGS. 1-7 illustrate and highlight the dual ophthalmic lens machining platform and simultaneous ophthalmic lens manufacturing method to which the present invention is directed. However, the blocking technique for the pre-blocked lens blanks, the machine tool configuration and control (e.g., tool path generation) and the machining particulars are described in U.S. Pat. Nos. 7,086,928; 6,953,381; and 6,568,990 as well as publication No.s 2006-0166609, 2005-0266772, 2003-0181133 and 2001-0051490 which are incorporated herein by reference in their entirety. The present disclosure focuses on the particulars of the dual ophthalmic lens machining platform and simultaneous ophthalmic lens manufacturing method.

Figure 1:
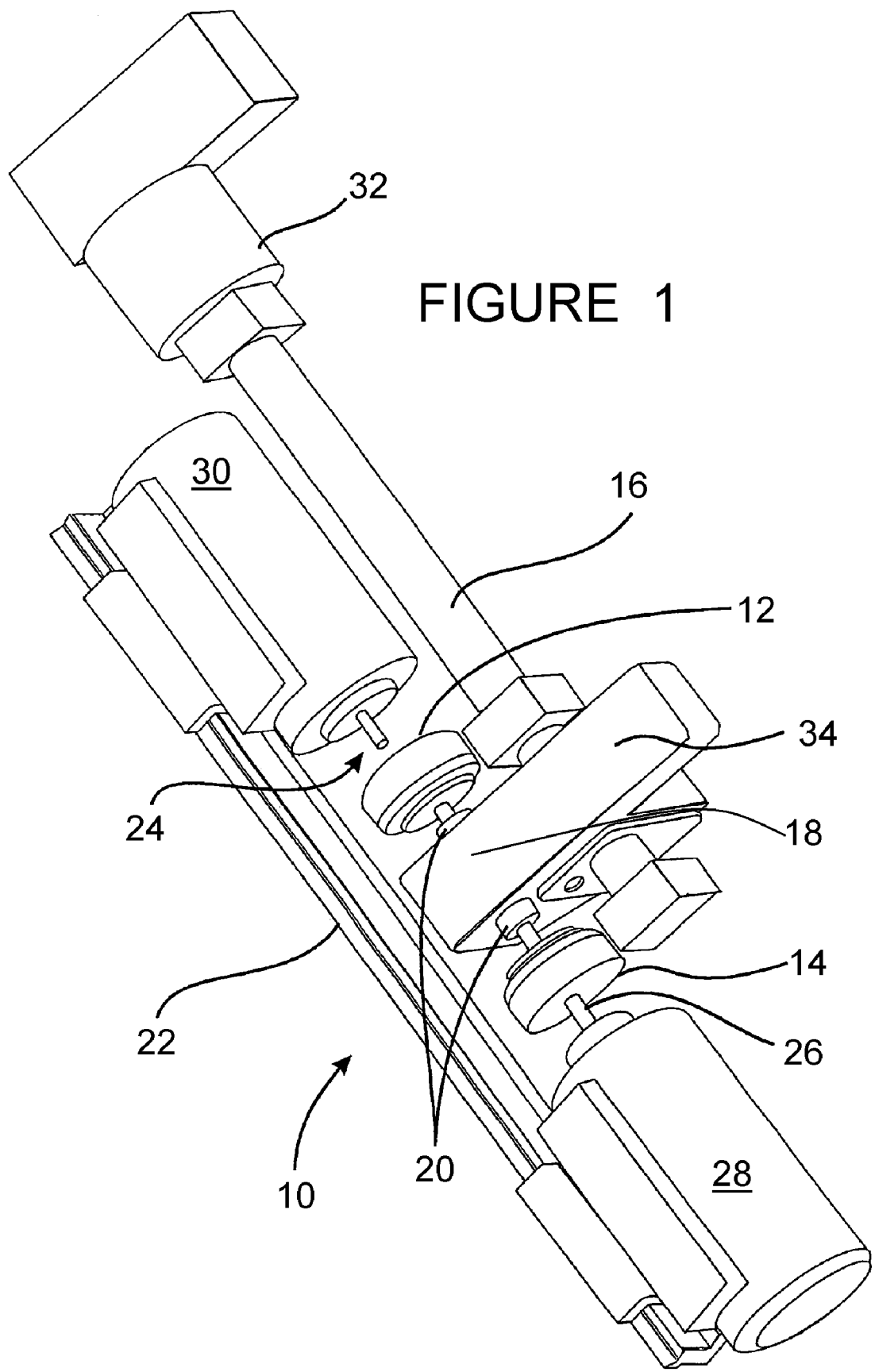
FIG. 1 shows a perspective schematic view representative of an exemplary dual ophthalmic lens machining platform according to one aspect of the present invention.

FIG. 1 shows an exemplary machining platform 10 that is operative to concurrently surface and edge two ophthalmic lenses from blocked lens blanks 12 and 14. The exemplary machining platform 10 may be further operative to machine both custom blocks for blocking lens blanks and both surface lap tools for polishing and fining ophthalmic lenses generated by the machining platform 10.

The exemplary machining platform 10 includes an articulation shaft 16 and a mounting stage 18 in operative connection with the articulation shaft 16. In the exemplary embodiment a computer system of the present invention is operative to selectively rotate the articulation shaft 16 to raise or lower the position of the mounting stage 18. The exemplary mounting stage 18 includes an arbor 20 which is selectively rotatable responsive to the computer processor. The arbor 20 is operative to receive two mounting blocks or blocked lens blanks 12 and 14 positioned at opposed ends of the arbor 20.

The machining platform 10 further comprises at least one ball slide carriage 22, at least two machining tools 24 and 26 and two spindle motors 28 and 30. The spindle motors 28 and 30 are in operative connection with the at least one ball slide carriage 22 and are positioned adjacent the opposed ends of the arbor 20. Each tool 24 and 26 is in releasable connection with a spindle motor 28 and 30 as will be understood by those of ordinary skill in the art. The spindle motors 28 and 30 are operative to rotate the tools 24 and 26 and are independently operative responsive to the computer processor to move toward and away from the arbor ends along the ball slide carriage 22. In the exemplary embodiment the articulation shaft 16 is turned by a planetary gear motor 32 mounted on the end of the articulation shaft 16. The arbor 20 is turned by the right angle gear motor 34 responsive to the computer processor.

In the exemplary embodiment of the machining platform 10, the computer processor is operative to selectively move the machining tools 24 and 26 relative the ends of the arbor 20 through a plurality of tool paths for machining custom blocks, surfacing and edging lens blanks 12 and 14, and surfacing lap tools. In addition to machining two lenses from lens blanks 12 and 14 simultaneously, two lap tools simultaneously, or two mounting blocks simultaneously, the exemplary embodiment of the machining platform may further be used to simultaneously machine both a block and a lap tool for a particular lens. In addition the exemplary machine may be used to simultaneously machine a lens and a corresponding lap tool for the lens.

Figure 2:
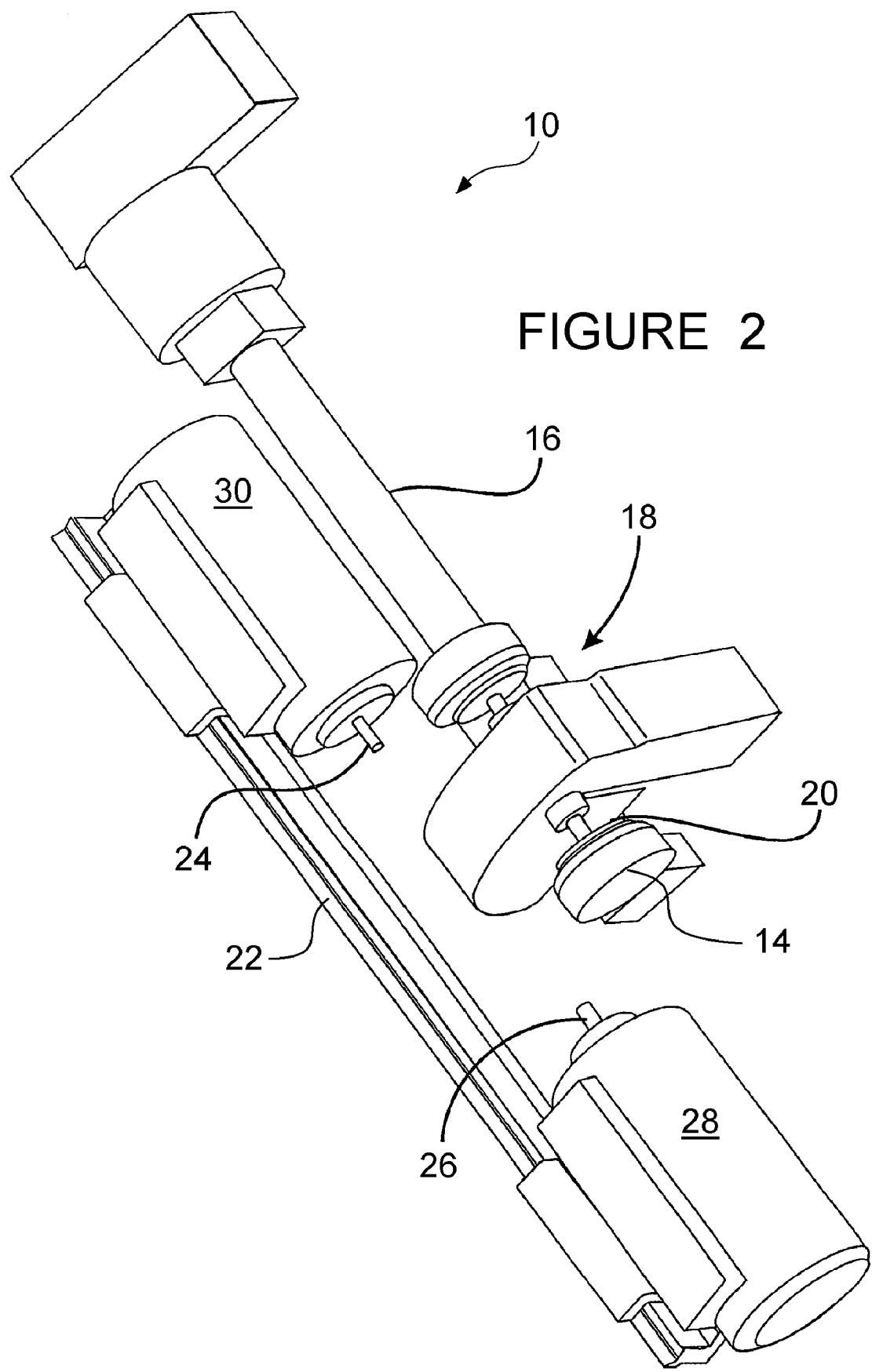
FIG. 2 shows a perspective schematic view of the exemplary machining platform of FIG. 1 with a mounting stage thereof rotated to an upward position.

FIG. 2 shows the exemplary machining platform 10 in a configuration that enables an operator to more easily mount and remove blocked lens blanks 12 and 14, lap tools and finished lenses from the machine platform 10. Here the articulation shaft arbor 16 responsive to the computer processor has rotated the mounting stage 18 upwardly to move the arbor 20 away from the machining tools 24 and 26. In this exemplary orientation, the tools 24 and 26 may also be more easily removed.

Figure 3:
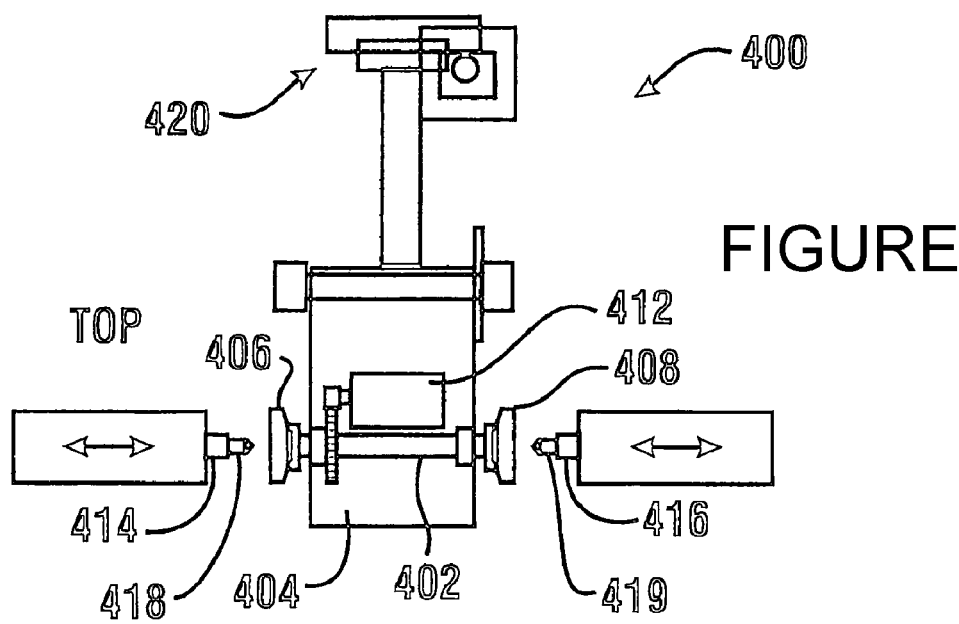
FIG. 3 shows a top plan schematic view of an exemplary dual ophthalmic lens machining platform according to one aspect of the present invention.
Figure 4:
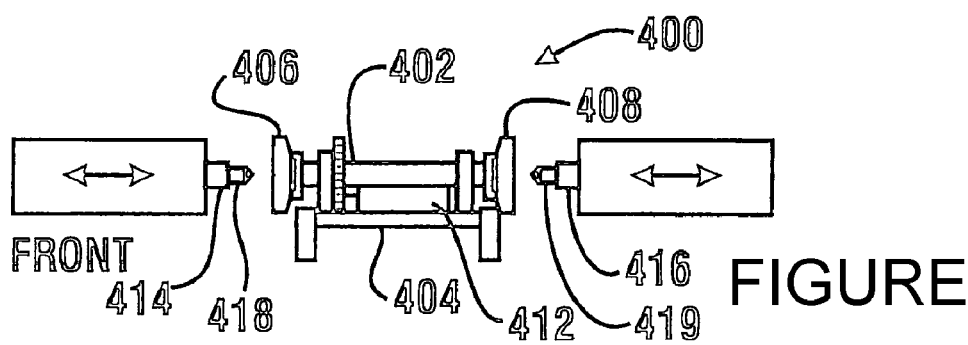
FIG. 4 shows a front plan schematic view of the exemplary machining platform of FIG. 3.
Figure 5:
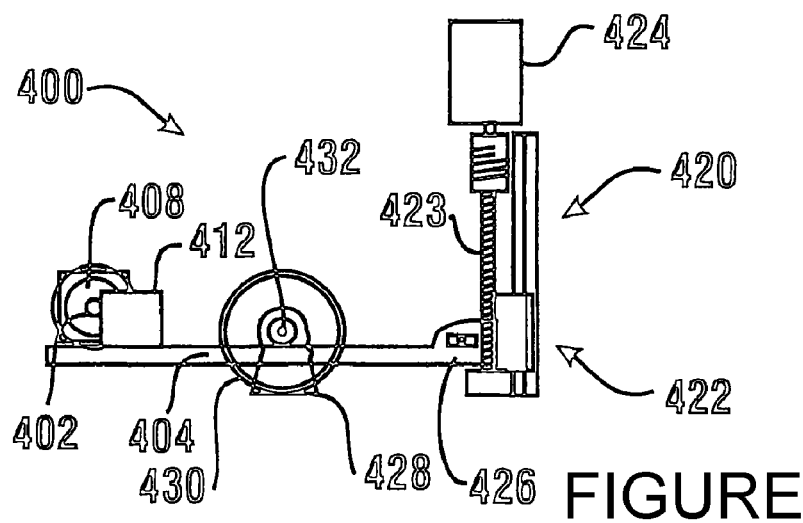
FIG. 5 shows a side plan schematic view of the exemplary machining platform of FIG. 3.

An alternative exemplary embodiment of a machining platform for the present invention is shown in FIGS. 3-5. FIG. 3 shows a top plan view of the machining platform 400 and FIG. 4 shows a front view of the machining platform 400. The machining platform 400 includes an arbor 402 mounted on a mounting stage 404. The arbor 402 is rotated by a servo-motor 412 in operative connection with the arbor 402.

The arbor 402 is operative to receive two blocked lens blanks 406 and 408 on opposed ends of the arbor 402. By selectively rotating the arbor with the servo motor 412, the angular orientation of the lenses can be changed. The machining platform 400 also includes two spindles 414 and 416, with tools 418 and 419 that are positioned adjacent to each of the lens blanks 406 and 408. In this described exemplary embodiment the axis of rotation of the tools 418 and 419 is orientated parallel to the axis of rotation of the arbor shaft. However, in other alternative embodiments other angular relationships between the spindles 414 and 416 and the arbor shaft may be used depending on the shape of the machining tool and the type of machining operation being performed.

Each of the spindles 414 and 416 is operative to move independently of each other toward and away from the lens blanks 406 and 408 respectively. This enables the machining platform 400 to machine the back surfaces of the lens blanks 406 and 408 simultaneously according to different prescription specifications for each lens being generated.

FIG. 5 shows a side view of machining platform 400. As shown in FIG. 5 the machining platform 400 is operative to selectively move the arbor in a plane perpendicular to the axis of rotation of the arbor shaft. In this described exemplary embodiment this is accomplished by having the mounting stage pivot at pivot point 432 of a pivot support 428. The amount of pivot angular rotation is selectively controlled by a stage-moving device 420. In this described exemplary embodiment the stage moving device 420 includes a ball slide 422 in operative connection with an end portion 426 of the mounting stage. The ball slide 422 is selectively driven along a ball screw 423 with a servo motor 424 that is operatively configured to selectively rotate the ball screw 423. The end portion 426 of the mounting stage moves up or down responsive to the movement of the ball slide 422. As a result the angular position of the mounting stage 404 can be selectively adjusted to move the arbor 402 and the lens blanks 406 and 408 relative to the machining tools.

In this described exemplary embodiment the pivot point 432 is located between the stage moving device 420 and the arbor 402. However, in alternative embodiments the arbor 402 may be located between the pivot point 432 and the stage moving device 420 or the stage moving device 420 may be located between the pivot point 432 and the arbor 402. The mounting stage may also include an encoder 430 at the pivot point 432 that is operative to measure the amount of angular rotation of the mounting stage relative the pivot support 428. Alternatively, a linear encoder could be used to monitor the linear position of a portion of the mounting stage. The feedback output of the encoder is used by the machining platform to control the operation of the servo motor of the stage moving device. This enables the system to accurately place the arbor in the proper position for machining the lens blanks according to the calculated tool paths.

Figure 6:
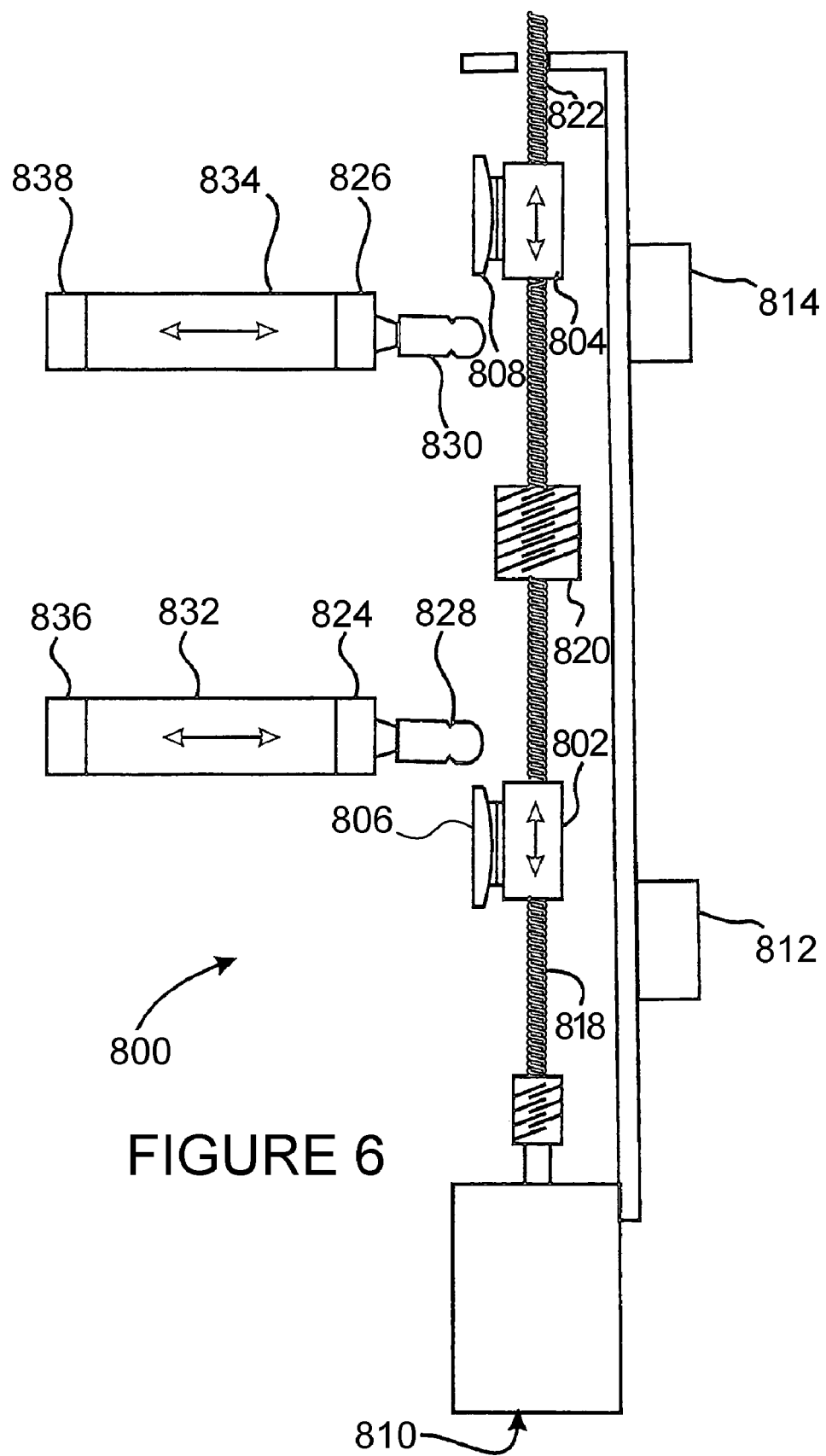
FIG. 6 is a schematic view representative of a dual ophthalmic lens machining platform according to one aspect of the present invention.

FIG. 6 shows a schematic view of a further alternative exemplary embodiment of a machining platform 800 of the present invention. Here the machining platform 800 includes two mounting stages 802 and 804 upon which blocked semi-finished lenses 806 and 808 are mounted for back surface generating and edging, and upon which reusable lap tools are mounted for surfacing. With two mounting stages 802 and 804, both right and left lenses are surfaced and edged at the same time from lens blanks 806 and 808. Similarly both the right and left mounting blocks and right and left lap tools for lenses may also be surfaced simultaneously with machining platform 800.

In this described embodiment the machining platform 800 includes an x-axis ball slide 810 and two y-axis ball slides 812 and 814. The x-axis ball slide 810 comprises a servo or stepper motor 816, a right handed ball screw 818, a flexible coupling 820, and a left handed ball screw 822. The mounting stage 804 for right lenses and right lap tools is driven by the left handed ball screw 822 and the mounting stage 802 for left lenses and left lap tools is driven by the right handed ball screw 818. The two stages 802 and 804 travel along the x-axis in synchronized opposing motion. The two ball screws are in operative connection with a flexible connector which couples the motion of the right-handed ball screw that is in direct connection with the drive motor with the motion of the left-handed ball screw. This arrangement enables the single motor 816 to drive both mounting stages 802 and 804 in coordinated opposing motion.

Figure 7:
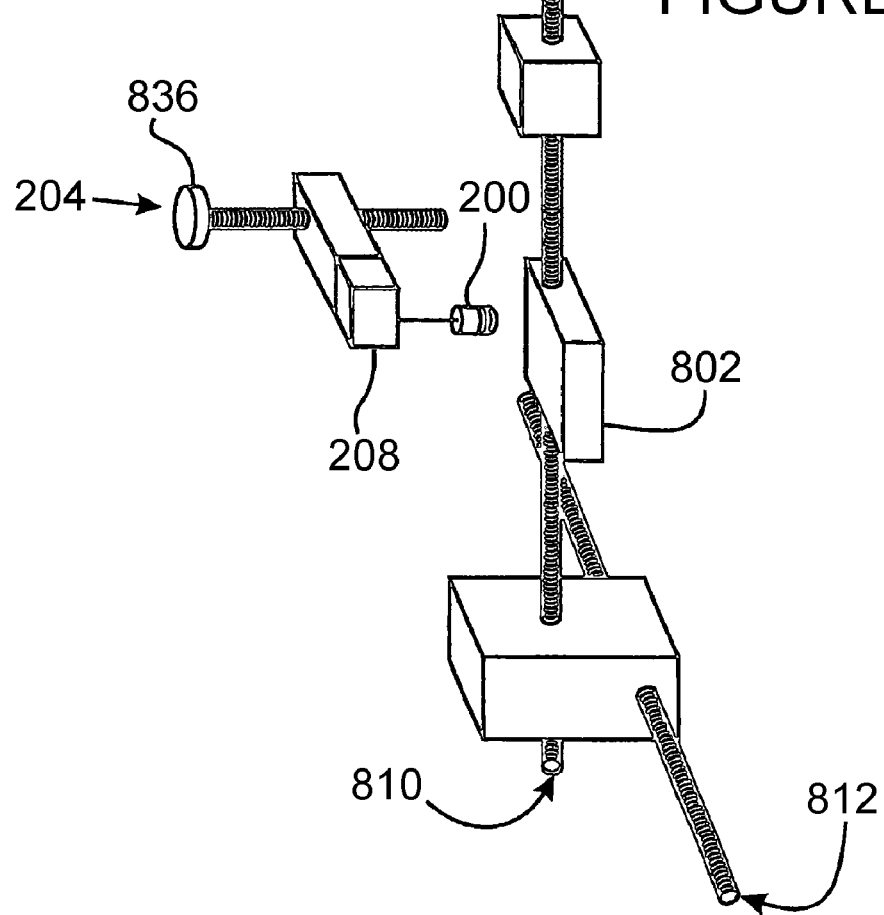
FIG. 7 shows the relative orientation of x ball slide, y ball slides, and z ball slides for the exemplary machining platform of FIG. 6.

As shown in FIG. 7, the single x-axis ball slide 810 is mounted on the two parallel y-axis ball slides 812 and 814 so both stages always move together in the y-axis. The y-axis ball slides 812 and 814 are also driven by a single servo or stepper motor (not shown). With this exemplary configuration, when one stage performs a circular motion in the x-y plane moving clockwise, the other stage performs precisely the same circular motion but moving counterclockwise.

In this described embodiment, the machining platform includes two high speed spindles 824 and 826 with corresponding tools 828 and 830. Spindle 824 for machining a left lens or left lap tool is in operative connection with a left z-axis ball slide 832. Spindle 826 for machining a right lens or right lap tool is in operative connections with a right z-axis ball slide 834. The two stages 802 and 804 move under the z-axis spindles 824 and 826 for simultaneous edging of both right and left lenses and for simultaneous surfacing of both right and left lenses. The two z-axis ball slides 832 and 834 are positioned generally perpendicular to the two y-axis ball slides 812 and 814. The z-axis position of each spindle tool is driven by its own servo motor or stepping motor 836 and 838. The motion of one tool can be and usually is independent of the other tool.

For all the described embodiments, the tools should rotate in opposite directions for the best results. Consequently, the tools affixed to each spindle require right or left isometric edge configurations appropriate for its spindle rotational direction and normal tool path direction. This allows both tools to cut uphill at the same time with conventional milling. Without opposing rotation, one spindle would be performing conventional milling while the other would be performing so called "climb" cutting. This opposing rotational direction is necessary in order to get similar finishes on the edges of the lenses.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention is defined in the appended claims and equivalents thereto.

What is claimed is:

1. Method of manufacturing ophthalmic lens comprising the steps of:
    Providing a machining platform that is operative to concurrently machine two ophthalmic lens and wherein the machining platform has at least one common axis of motion for the two ophthalmic lens being machined;
    Mounting at least a first and a second blocked lens blank on the machining platform; and
    Simultaneously performing at least one machining process on the two blocked lens blanks on the machining platform.

2. The method of manufacturing ophthalmic lens according to claim 1 wherein the step of simultaneously performing at least one machining process on the two blocked lens blanks on the machining platform includes simultaneously machining left and right ophthalmic lens from the blocked lens blanks on the machining platform.

3. The method of manufacturing ophthalmic lens according to claim 1 wherein the step of simultaneously performing at least one machining process on the two blocked lens blanks on the machining platform includes back surface generation of the lens blanks and edging of the lens blanks.

4. The method of manufacturing ophthalmic lens according to claim 3 wherein the back surface generation of each lens blank includes machining a back surface of the lens blank responsive to data representative of an eyeglass prescription.

5. The method of manufacturing ophthalmic lens according to claim 3 wherein the edging of each lens blank includes machining an edge of the lens blank to include a contour adapted to be mounted in the lens receiving portion of an eyeglass frame responsive to data representative of the lens receiving portion.

6. The method of manufacturing ophthalmic lens according to claim 3 wherein each lens blank remains blocked throughout the back surface generation and the edging of the lens blanks.

7. The method of manufacturing ophthalmic lens according to claim 1 wherein the lens blanks are mounted on the lens blocks without regard to specific lens prescription data.

8. The method of manufacturing ophthalmic lens according to claim 1 wherein the at least one common axis of motion for the two ophthalmic lens blanks being machined includes at least a common rotary axis for each lens blank.

9. The method of manufacturing ophthalmic lens according to claim 1 wherein the at least one common axis of motion for the two ophthalmic lens blanks being machined includes at least a common linear axis for each lens blank.

10. The method of manufacturing ophthalmic lens according to claim 9 wherein the at least one common axis of motion for the two ophthalmic lens blanks being machined includes at least a common rotary axis for each lens blank.

11. The method of manufacturing ophthalmic lens according to claim 1 the common axis of motion for the two ophthalmic lens blanks being machined includes at least two common linear axes for each lens blank.

12. Method of manufacturing a pair of ophthalmic lens for a pair of eyeglasses comprising the steps of:
Providing a machining platform that is operative to concurrently machine two ophthalmic lenses;
Mounting a left and a right blocked lens blank on the machining platform adapted to form a left and a right lens for a pair of eyeglasses; and
Simultaneously performing at least one machining process on the left and right blocked lens blanks on the machining platform.

13. The method of manufacturing ophthalmic lens according to claim 12 wherein the left and right ophthalmic lens blanks being machined includes at least a common rotary axis for each lens blank on the machining platform.

14. The method of manufacturing ophthalmic lens according to claim 12 wherein the left and right ophthalmic lens blanks being machined includes at least a common linear axis for each lens blank on the machining platform.

15. The method of manufacturing ophthalmic lens according to claim 12 wherein the step of simultaneously performing at least one machining process on the two blocked lens blanks on the machining platform includes back surface generation of the lens blanks and edging of the lens blanks.

16. A dual ophthalmic lens machining platform comprising:
A blocked lens mounting structure constructed to simultaneously receive a first and a second blocked lens blank, and configured to rotationally and linearly move each lens blank, wherein the first and second lens blank have at least one common axis of movement on the mounting structure; and
At least one machine tool adapted to machine each lens blank.

17. The dual ophthalmic lens machining platform according to claim 16 wherein the blocked lens mounting structure includes an arbor that rotationally supports both blocked lens blanks.

18. The dual ophthalmic lens machining platform according to claim 16 wherein the blocked lens mounting structure includes a first mounting stage that receives the first lens blank and a second mounting stage that receives the second lens blank and wherein the first and second stages share a common linear actuator.

19. The dual ophthalmic lens machining platform according to claim 16 wherein machine tools are provided for each lens blank that are configured to perform back surface generation of the lens blanks and edging of the lens blanks.

20. The dual ophthalmic lens machining platform according to claim 16 wherein the blocked lens mounting structure is configured to simultaneously receive and machine a left and a right blocked lens blank for forming a left and a right lens of a pair of eyeglasses.

* * * * *